Figure 1:
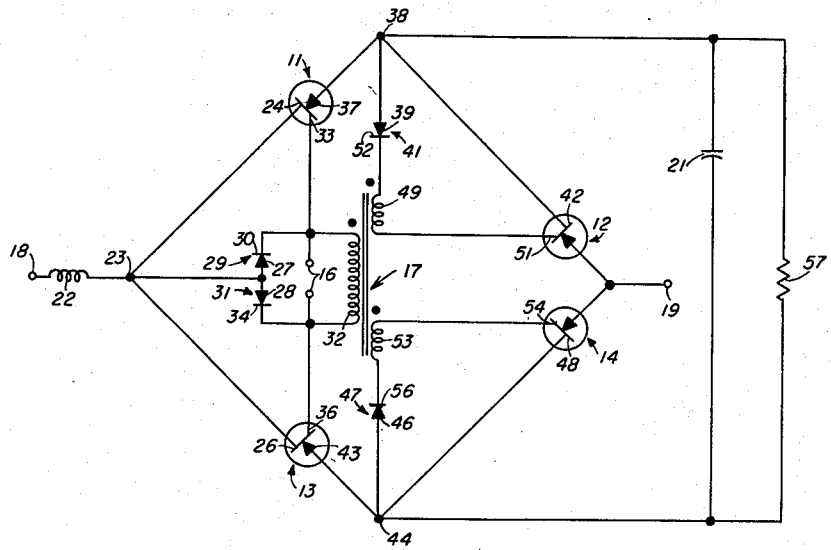

Nov. 5, 1963 J. T. REDFERN 3,109,977
SILICON CONTROLLED RECTIFIER D.C. TO A.C. INVERTER UTILIZING
BRIDGE TYPE ARRANGEMENT WITH SINGLE
COMMUTATING CAPACITOR
Filed May 26, 1960

INVENTOR.
JOHN T. REDFERN
BY
ATTORNEYS

United States Patent Office 3,109,977
Patented Nov. 5, 1963

3,109,977
SILICON CONTROLLED RECTIFIER D.C. TO A.C. INVERTER UTILIZING BRIDGE TYPE ARRANGEMENT WITH SINGLE COMMUTATING CAPACITOR
John T. Redfern, 5163 Chelsea, La Jolla, Calif.
Filed May 26, 1960, Ser. No. 32,056
2 Claims. (Cl. 321—44)
(Granted under Title 35, U.S. Code (1952), sec. 266)

The invention described herein may be manufactured and used by or for the Government of the United States of America for governmental purposes without the payment of any royalties thereon or therefor.

This invention relates to a silicon controlled rectifier D.C. to A.C. inverter and more particularly to a silicon controlled rectifier D.C. to A.C. inverter utilizing a single commutating capacitor.

The prior art gas tube type D.C. to A.C. inverters have all had disadvantages of warm-up time, excessive space and weight requirements, high internal power loss, limited frequency range, and excessive cost. The controlled rectifier prior art inverters have had the disadvantage of multiple commutating capacitors which necessarily increase size, weight and cost considerations and no provision for removing reverse bias on the control elements of the control rectifiers. This last deficiency results in burning out rectifiers in the event of excessive control current.

It is thus an object of the present invention to provide a controlled rectifier D.C. to A.C. inverter which is compact, economical, and light weight.

A further object is the provision of a controlled rectifier D.C. to A.C. inverter in which reverse bias current is eliminated.

Still another object of the present invention is to provide a controlled rectifier D.C. to A.C. inverter with a minimum of maintenance requirements.

Yet another object of the invention is to provide a D.C. to A.C. inverter which is extremely versatile in frequency and current ranges of operation.

According to the invention, a plurality of controlled rectifiers are connected to a bridge loop configuration. The D.C. input is applied at one diagonal and the A.C. output taken across the other diagonal of the rectifier bridge. A control signal is applied to all of the rectifiers in each leg of the bridge and phased in a manner that opposite pairs are in phase and adjacent pairs are out of phase. A diode is placed in each control element circuit for virtually eliminating reverse bias current. A single commutating capacitor is then placed across the output terminals for turning off alternate pairs of rectifiers as the other pair receives its positive bias signal. Thus, it is seen that the disadvantages of the prior art gas tube inverters have been overcome by the use of controlled rectifiers and the disadvantages of the prior art controlled rectifier inverters have been overcome in that a single commutating capacitor can be utilized along with a simple excitation circuit to be described in detail in the body of the specification.

Figure 2:
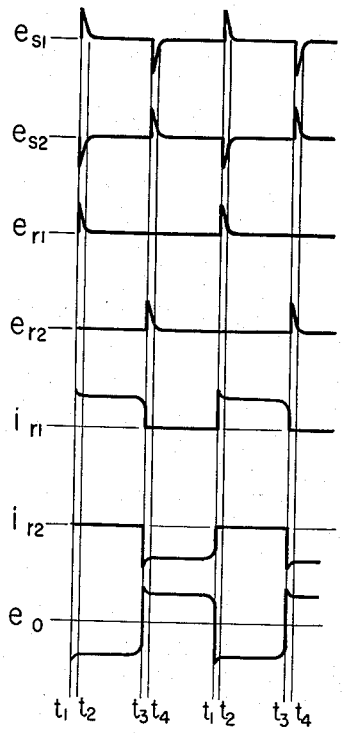

These and other attendant advantages of the instant invention will be appreciated with reference to the following detailed description in conjunction with the drawings in which:

FIG. 1 is a schematic representation of the preferred embodiment of the present invention; and FIG. 2 is a graphic illustration of typical wave forms present throughout the circuit of FIG. 1.

Referring in general to FIG. 1 there are shown four controlled rectifiers, preferably silicon, at 11, 12, 13, and 14. A control excitation source is indicated at 16 which excites the four controlled rectifiers through transformer 17. A D.C. supply is applied at terminals 18 and 19, and the output is taken across commutating capacitor 21.

Input terminal 18 is coupled through inductor 22 to junction point 23. Junction point 23 is connected to cathode 24 of control diode 11, cathode 26 of control diode 13 and anodes 27 and 28 of diodes 29 and 31, respectively. Cathode 30 of diode 29 is connected to one end of winding 32 of transformer 17, one side of control source 16 and control element 33 of diode 11. Cathode 34 of diode 31 is connected to the other side of control source 16, and the other side of winding 32 of transformer 17 and to control element 36 of diode 13. Anode 37 of diode 11 is connected to output terminal 38, anode 39 of diode 41, and cathode 42 of controlled diode 12. Anode 43 of controlled diode 13 is connected to output terminal 44, which in turn is connected to anode 46 of diode 47 and cathode 48 of controlled diode 14. Secondary winding 49 of transformer 17 is connected between control element 51 of control diode 12 and cathode 52 of diode 41. Secondary winding 53 of transformer 17 is connected between control element 54 of controlled diode 14 and cathode 56 of diode 47. Commutating capacitor 21 and load 57 are connected across output terminals 38 and 44.

Referring now to FIG. 2, waveform $e_{s1}$ is the signal present at the top of winding 32 with respect to the bottom of winding 32. Waveform $e_{s2}$ shows the waveform as seen from the bottom of winding 32 as compared to the top of winding 32. Waveform $e_{r1}$ is the voltage waveform that is applied between the control element 33 and cathode 24 of control rectifier 11. Waveform $e_{r2}$ is the voltage waveform applied between control element 36 and cathode 26 of control rectifier 13. Waveform $i_{r1}$ is the current waveform flowing through control rectifiers 11 and 14. Waveform $i_{r2}$ is the current waveform flowing through control rectifiers 12 and 13. Waveform $e_0$ is the voltage appearing at output terminals 38 and 44. $t_1$, $t_2$, $t_3$ and $t_4$ indicate the respective time widths of the control voltage pulses.

Circuit operation

Control rectifiers 11, 12, 13 and 14 can be any of the commercially available rectifiers of this type such as the General Electric C35 or the Westinghouse models under the trade name Trinister. As is known to the art these silicon rectifiers act as a three element thyratron type tube with the anode analogous to the plate of the tube, the control element analogous to the grid of the tube and the cathode, of course, analogous to the cathode of the tube. Thus, the rectifiers will not start conducting in a forward direction until a predetermined control current is passed from the cathode to the control element (electron flow) of a sufficient magnitude to overcome the surface barrier between the cathode and anode of the rectifier. Also as in the thyratron type tubes, once forward current has started, the control element loses its control of current flow and the rectifier approaches a short circuit of very low impedance in the forward direction. The original non-conducting condition is then reached by the forward current falling below the extinguishing point in the control rectifier.

With the above analogy in mind, a D.C. voltage is supplied between terminals 18 and 19, which in the preferred embodiment is 28 volts, with the negative terminal applied at terminal 18. At this point there would be two current paths from the negative terminal 18 to positive terminal 19, the first being through diodes 13 and 14 in series. As was explained above, however, the diodes will not conduct until a control bias current is applied between the respective cathodes and control elements. This control bias current is supplied from source 16 and is indicated at waveform $e_{s1}$ and $e_{s2}$ in FIG. 2.

Transformer 17 applies the necessary bias signal to diodes 12 and 14 while diodes 11 and 13 are coupled directly to source 16. It is pointed out that the polarity of the transformer windings of transformer 17 are such that the top of the windings will all be of the same polarity. Thus, assuming a positive polarity or a waveform of $e_{s1}$ at the top of primary winding 32, current will flow from top to bottom through the winding through diode 31 to cathode 24 and control element 33 of diode 11 back to the top of winding 32, turning on diode 11. Diode 13 will be blocked since there is no bias current applied between control element 36 and cathode 26. Diode 12 will likewise be blocked since diode 41 will block any attempted reverse current through control element 51 and cathode 42. It is pointed out that reverse bias current will burn out silicon control diodes if of sufficient amplitude and duration. Diode 14 has the same polarity control pulse applied to it as diode 11, thus current flows through the secondary winding 53, diode 47, cathode 48 and control element 54 back to the other side of winding 53. It is pointed out at this time that the voltage waveform seen between control element and cathode of diodes 11 and 14 is $e_{r1}$ of FIG. 2 and the waveforms seen by diodes 13 and 12 will be $e_{r2}$ of FIG. 2. At time $t_1$ when waveform $e_{r1}$ is applied to diodes 11 and 14 they are turned on causing electron flow from input terminal 18 through inductance 22, diode 11 through load 57 and diode 14 back to the positive terminal 19. Thus, commutating capacitor 21 will be charged negative on the top and positive on the bottom as indicated by $e_0$. Diodes 11 and 14 will continue conducting until $t_3$ when a positive control signal is applied to diodes 12 and 13 in the same manner as described with respect to diodes 11 and 14 except in this case, diodes 31 and 41 will be conducting and diodes 29 and 47 will not. Thus waveform $e_{r2}$ will be seen between the control elements and cathodes of diodes 12 and 13 which will cause forward electron flow. At this point electrons will flow from negative terminal 18 through inductance 22, diode 13, up through load 57, and through diode 12 to the positive terminal 19. This current reverse also reduces the current through diode 11 and 14 below their extinguishing point and diodes 11 and 14 are rendered non-conducting. At this time it is emphasized here that inductance 22 is to prevent a short circuit of terminal 18 and 19 should all four diodes become conducting during the switchover. The leading edge of wave forms $i_{r1}$, $i_{r2}$ and $e_0$ has a peak on it due to the inductive reactance of inductance 22. The rounded trailing edge of these last mentioned waveforms is created by the discharge time of commutating capacitor 21 during the transition or polarity reversal.

Thus, a D.C. to A.C. inverter has been disclosed which overcomes the disadvantages of the prior art in that it is simple, compact, inexpensive, easy to maintain and utilizes a single commutating capacitor and a small three winding transformer. The further refinement of eliminating any reverse current bias obviates the possibility of burning out the controlled diodes due to a reverse current overload.

Obviously many modifications and variations of the present invention are possible in the light of the above teachings. It is therefore to be understood that within the scope of the appended claims the invention may be practiced otherwise than as specifically described.

What is claimed is:

1. A D.C. to A.C. inverter consisting of a plurality of controllable solid state rectifiers each having an anode, a cathode, and a control element, connected in a bridge loop having four legs, said loop having a pair of D.C. input terminals across one diagonal junction thereof and a pair of output terminals across the other diagonal junction thereof, the anodes of said rectifiers in two adjacent legs connected together at one D.C. input terminal and the cathodes of said rectifiers in the other two legs connected together at the other D.C. input terminal, control signal coupling means connected to said respective control elements for applying a control signal to said control elements, said control signal being coupled in phase to rectifiers in diagonally opposite legs and out of phase to rectifiers in adjacent legs, means connected to said respective control elements for eliminating reverse bias current to said controllable rectifiers, and a sole commutating capacitor connected in parallel across said output terminals so as to be in parallel with any load connected between said output terminals.

2. A D.C. to A.C. inverter consisting of a plurality of controllable solid state rectifiers each having an anode, a cathode and a control element, connected in a bridge loop having four legs, said loop having a pair of D.C. input terminals across one diagonal junction thereof and a pair of output terminals across the other diagonal junction thereof, the anodes of said rectifiers in two adjacent legs connected together at one D.C. input terminal and the cathodes of said rectifiers in the other two legs connected together at the other D.C. input terminal, control signal coupling means connected to said respective control elements for applying to said rectifiers a control signal which is in phase to rectifiers in diagonally opposite legs and out of phase to rectifiers in adjacent legs, said control signal coupling means consisting of a single transformer having a sole primary winding adapted to be connected to a control signal and connected to the control elements of the rectifiers adjacent to one of said D.C. input terminals in phase opposition and having a pair of oppositely phased secondaries each connected to the respective control elements of the rectifiers of the other two legs, whereby the control elements in adjacent legs are excited out of phase, an inductor in series with one of said D.C. input terminals and a sole commutating capacitor connected across said output terminals so as to be in parallel with any load connected between said output terminals.

References Cited in the file of this patent

UNITED STATES PATENTS

| | | |
|---|---|---|
| 1,902,495 | Fitzgerald | Mar. 21, 1933 |
| 1,918,870 | Sabbah | July 18, 1933 |
| 2,147,474 | Wagner et al. | Feb. 14, 1939 |
| 2,417,609 | Muzzey et al. | Mar. 18, 1947 |
| 2,821,639 | Bright et al. | Jan. 28, 1958 |
| 2,986,692 | Fischer | May 30, 1961 |
| 2,987,666 | Manteuffel | June 6, 1961 |